(12) United States Patent
Adcock

(10) Patent No.: US 8,340,351 B2
(45) Date of Patent: Dec. 25, 2012

(54) METHOD AND APPARATUS FOR ELIMINATING UNWANTED OBJECTS FROM A STREAMING IMAGE

(75) Inventor: Timothy A. Adcock, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 606 days.

(21) Appl. No.: 12/496,454

(22) Filed: Jul. 1, 2009

(65) Prior Publication Data

US 2011/0002542 A1     Jan. 6, 2011

(51) Int. Cl.
*G06K 9/00* (2006.01)
*H04N 5/217* (2006.01)

(52) U.S. Cl. ........................................ 382/103; 348/241

(58) Field of Classification Search ................... 382/103, 382/107, 236, 159, 181; 348/169, 170, 171, 348/172, 683, 833; 358/463; 359/160
See application file for complete search history.

(56) References Cited

U.S. PATENT DOCUMENTS

| | | | |
|---|---|---|---|
| 6,750,900 B1* | 6/2004 | Cok | 348/169 |
| 7,418,131 B2* | 8/2008 | Wang et al. | 382/165 |
| 7,483,062 B2* | 1/2009 | Allman et al. | 348/239 |
| 7,957,468 B2* | 6/2011 | Lin | 375/240.24 |
| 2005/0129324 A1* | 6/2005 | Lemke | 382/254 |

* cited by examiner

*Primary Examiner* — Abolfazl Tabatabai
(74) *Attorney, Agent, or Firm* — Mirna Abyad; W. James Brady; Frederick J. Telecky, Jr.

(57) ABSTRACT

A method and apparatus for eliminating unwanted objects in a streaming image. The method includes recognizing unwanted objects in a streaming image and eliminating the recognized unwanted objects from the streaming image.

9 Claims, 4 Drawing Sheets

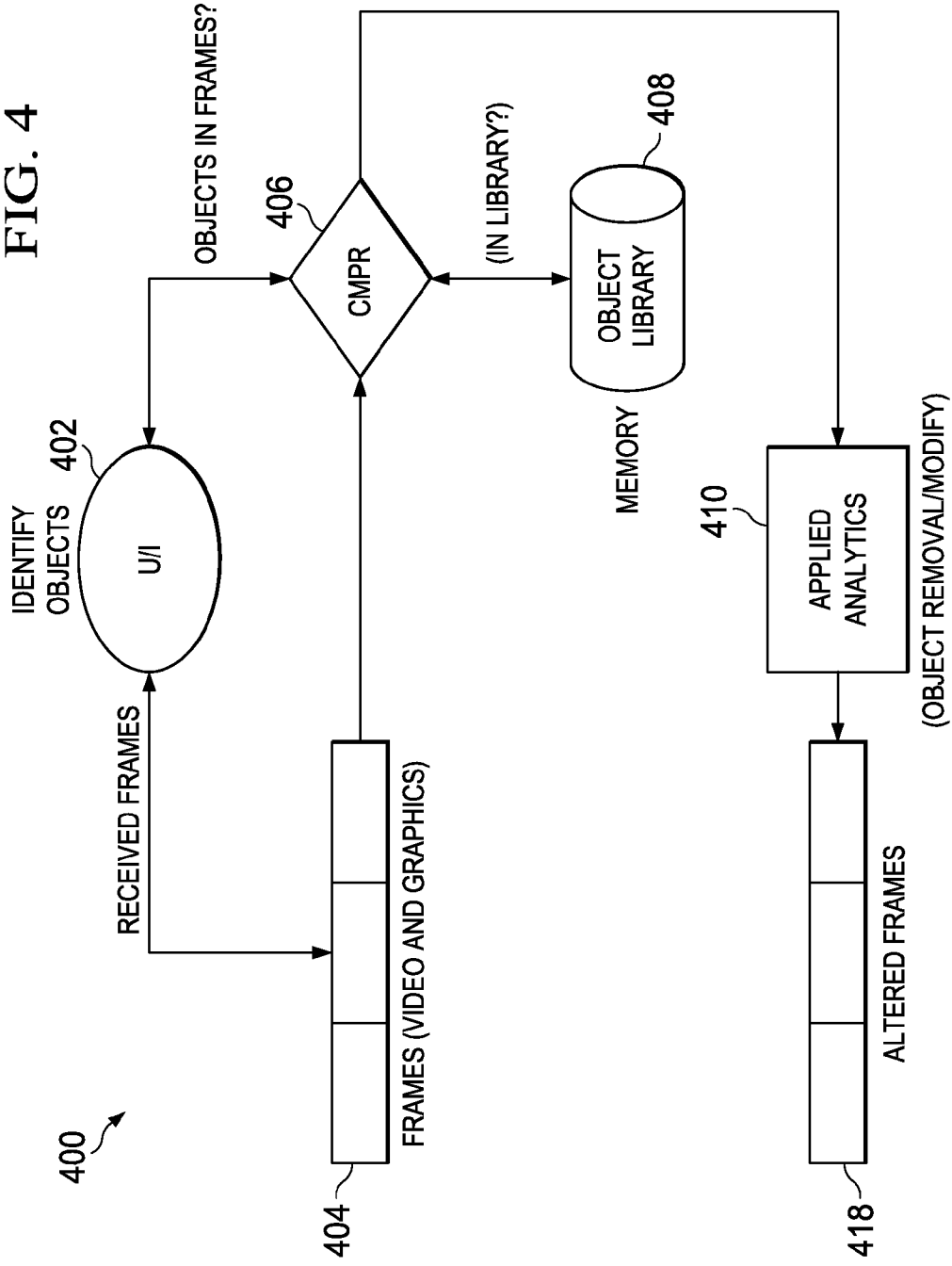

METHOD AND APPARATUS FOR ELIMINATING UNWANTED OBJECTS FROM A STREAMING IMAGE

BACKGROUND OF THE INVENTION

1. Field of the Invention

Embodiments of the present invention generally relate to a method and apparatus for eliminating unwanted objects from a streaming image.

2. Background of the Invention

When watching streaming images or video, unwanted objects may appear with or in the stream that are not welcome or inappropriate. For example, some advertisement may be included on the lower corner or the images may include indecent objects.

Currently, this problem can be dealt with by fast forwarding through the image when a DVR is utilized, pre-editing of the frame by the image generator and be removing the frame from the streaming images. However, all these solutions do not allow the user to edit live streaming images or without totally eliminating the entire frame.

Therefore, there is a need for an improved method and apparatus for eliminating unwanted objects from streaming images.

SUMMARY OF THE INVENTION

Embodiments of the present invention relate to a method and apparatus for eliminating unwanted objects in a streaming image. The method includes recognizing unwanted objects in a streaming image and eliminating the recognized unwanted objects from the streaming image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

In this application, a computer readable processor is any medium accessible by a computer for saving, writing, archiving, executing and/or accessing data. Furthermore, the method described herein may be coupled to a processing unit, wherein said processing unit is capable of performing the method.

FIG. 4 is an embodiment depicting an object removal user interface system.

DETAILED DESCRIPTION

Figure 1:
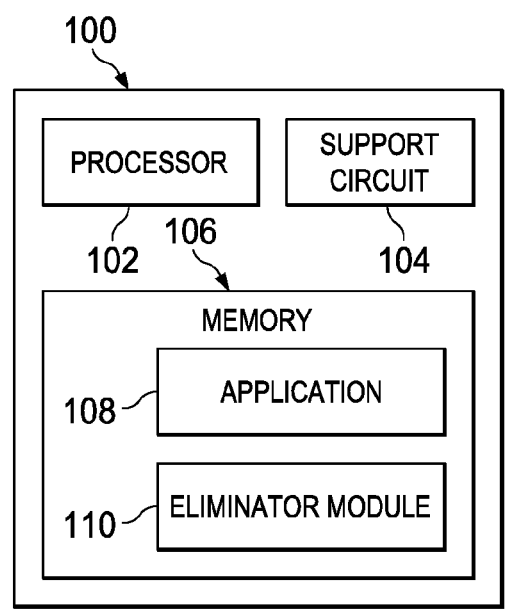
FIG. 1 is an embodiment of an apparatus for eliminating unwanted objects on streaming unwanted images.

FIG. 1 is an embodiment of an apparatus 100 for eliminating unwanted objects from streaming images. The apparatus 100 includes a processor 102, support circuitry 104, and memory 106.

The processor 102 may comprise one or more conventionally available microprocessors. The microprocessor may be an application specific integrated circuit (ASIC). The support circuits 104 are well known circuits used to promote functionality of the processor 102. Such circuits include, but are not limited to, a cache, power supplies, clock circuits, input/output (I/O) circuits and the like. The memory 106 may comprise random access memory, read only memory, removable disk memory, flash memory, and various combinations of these types of memory. The memory 106 is sometimes referred to main memory and may, in part, be used as cache memory or buffer memory. The memory 106 may store an operating system (OS), database software, and various forms of application software, such as, applications 108, eliminating module 110.

The applications 108 are any applications that are stored or utilized by the apparatus 100. The eliminator module 110 eliminates unwanted objects from streaming images. For example, a viewer my elect to remove advertisement display at the lower corners of the image or to blur objects the viewer deems inappropriate. The viewer has the ability to perform such elimination on live streaming images.

The viewer may have options for eliminating such objects. For example, the viewer may choose to remove the object, unfocus or blur the object or allow the elimination module 110 to predict an appropriate replacement. If the user elects to remove the object, then the object may be blacked out. If the user elects to find a proper replacement, the elimination module 110 utilized other frames to predict a proper replacement.

The elimination module 110 may include a list of unwanted objects. The list may be created by the viewer at an earlier time. Such list may be edited, deleted or updated by the viewer. The list may include elimination information, such as, objects pre-approved for removal, the preferred method of removal per object and may allow for different lists for different viewers. As such, a parent list may include the elimination of advertisement, whereas, a child's list may include both advertisement and sexual content elimination. Furthermore, the elimination module 110 may allow for a logon and/or a password to identify the various viewers and the viewer's elimination list.

Therefore, the elimination module 110 allows the viewer to eliminate objects manually, as the objects appear or right before they appear on a display screen, or automatically via the elimination list. The elimination module 110 may allow some or all users to turn on and off the elimination feature. The elimination module 110 is capable of eliminating unwanted objects when the elimination feature is set to elimination mode or on.

The elimination module 110 may recognize an unwanted object by determining edges in the image that do not belong or by identifying an object or a location of an object that may be unwanted or inappropriate. Hence, the elimination module 110 is capable of eliminating unwanted objects on the fly, with live streaming video/images and automatically or manually.

Figure 2:
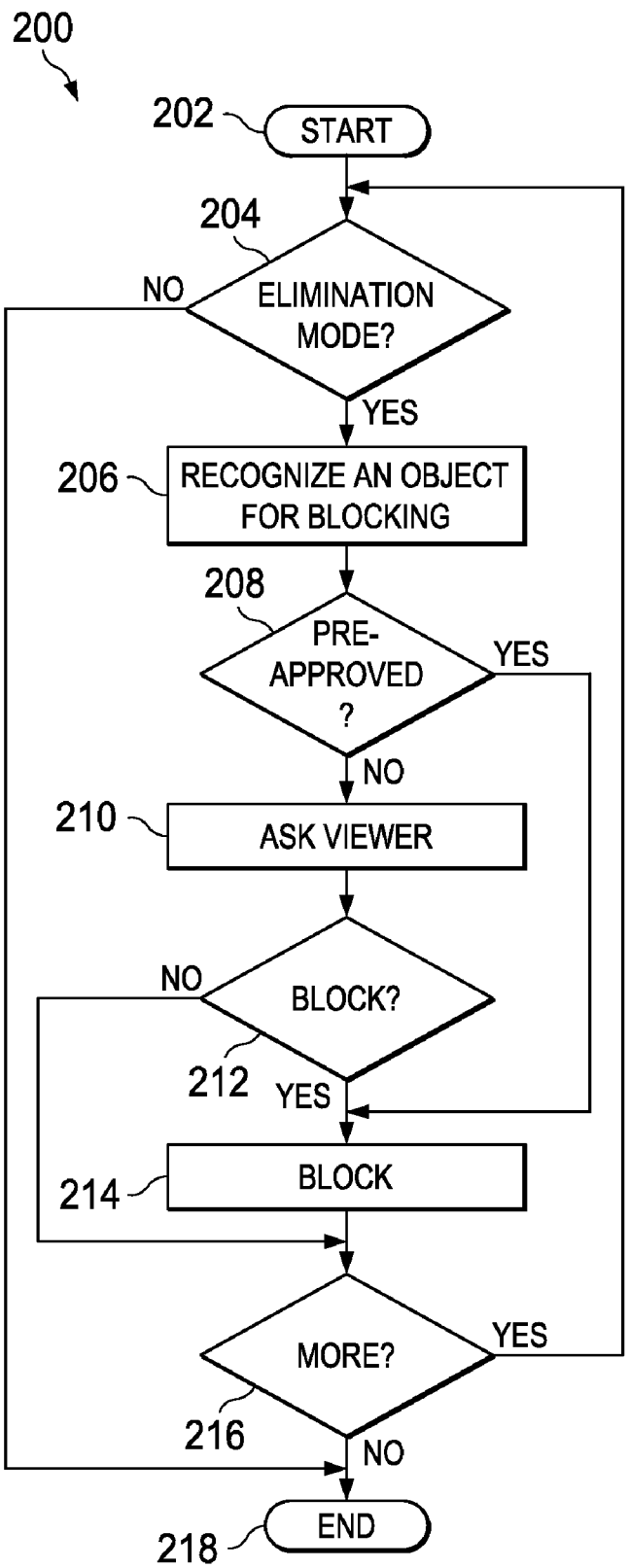
FIG. 2 is a flow diagram depicting an embodiment of a method for eliminating unwanted objects from streaming images.

FIG. 2 is a flow diagram depicting an embodiment of a method 200 for eliminating unwanted objects from streaming images. The method 200 starts at step 202 and proceeds to step 204. At step 204, the method 200 determines if a device, system or apparatus is in elimination mode. If it is not in elimination mode, the method 200 proceeds to step 218. If it is in elimination, the method 200 proceeds to step 206. At step 206, the method 200 recognizes an object for blocking. At step 208, the method 200 determines if the object is preapproved for blocking, for example, an elimination list exists that list such an object. If the object is preapproved, the method 200 proceeds to step 214. Otherwise, the method 200 proceeds to step 210.

At step 210, the method 200 asks the viewer if the object should be removed. If the object should be removed, the method 200 proceeds to step 214. At step 214, the method 200 removes the object and proceeds to step 216. If the object is not to be removed, the method 200 proceeds from step 212 to step 216. At step 216, the method 200 determines if there are more objects images to analyze. If there are more images to analyze, the method 200 proceeds to step 204. Otherwise, the method 200 proceeds to step 218. The method 200 ends at step 218.

Figure 3:
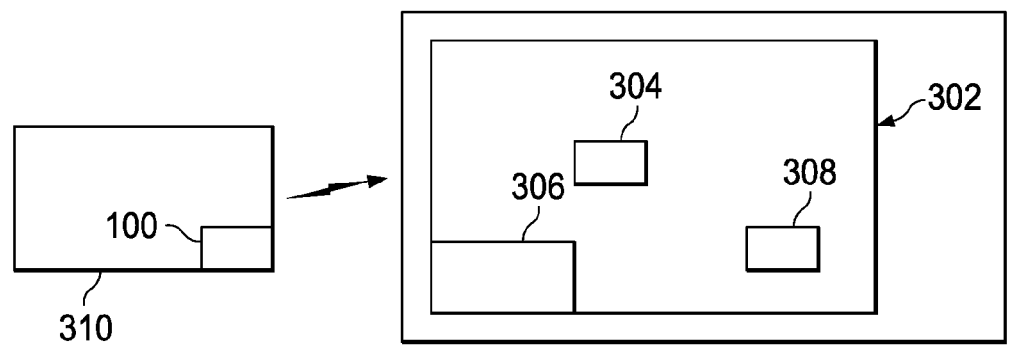
FIG. 3 is an embodiment depicting a system for eliminating unwanted objects from streaming images.

FIG. 3 is an embodiment depicting a system 300 for eliminating unwanted objects in streaming images. The system 300 includes a display 302, objects 304, 305 and 306, handheld device 310 and apparatus 100 (FIG. 1). The display 302 may be any display capable of displaying images, video and the like. In this embodiment, the objects 304 is an object embedded in the image stream, for example, a part of the original image—such a body part, pistol, etc. Whereas, objects 306 and 308 are objects that were added after the taking of the screen, such as, advertisement, future movie commercial and the like.

The handheld device 310 is an object that is capable of communicating with the display 302 and/or the apparatus 100. The handheld device 310 may be capable of wirelessly communicating with the display 302, may be coupled to the display 302 or may be included within the display 302. The apparatus 100 may include all or some of the items described in FIG. 1. The apparatus 100 is capable of executing the method 200 (FIG. 2).

For example, unwanted objects may appear on live streaming video/images. The apparatus 100 may detect and recognize that the viewer preapproved objects 304 and 306 to be removed. The apparatus 100 eliminates the objects from the stream prior to the images' display on the display 302. However, object 308 is not preapproved. The apparatus 100 then queries the viewer to determine if the viewer wished to remove object 308. The viewer approves the removal of the object 308; however, the viewer may elect to find the proper replacement to the object 308. The object may, for example, place a doll in a child's hand in the image with a book.

In other circumstances, the viewer may choose that object 308 be only blurred or not to be eliminated. In such cases, the apparatus 100 is capable of performing such requests on live streaming images/video.

The system 300 is merely an example of a system that utilizes the herein described invention. It should be noted that system 300 may include multiple displays 302. Hence, the same streaming images may be edited by eliminating unwanted objects differently or different displays 302 in the same system 300. It should also be noted that the apparatus 100 may be incorporated into a remote control, a television, a computer, a laptop, a digital video recorder (DVR), MP3 player and the likes.

FIG. 4 is an embodiment depicting utilizing an object removal user interface system 400 that includes a user interface 402, frames 404, CMPR 406, object library 408, applied analytics 410 and altered frames 412. The user interface 402 receives frames 404. The user interface 402 identifies unwanted objects in the frames 404. The frames 404 may be video, graphics, images and the like. The frames 404 may be introduced from a live broadcast, DVD, recorded data and the like. The CMPR 406 determines if the objects identified by the frames are unwanted and/or the CMPR 406 may receive the frames directly and identify unwanted objects. The user interface 402 may be in elimination mode, wherein the user interface 402 eliminates unwanted objects by comparing identified objects to objects in the object library 408.

The object removal user interface system 400 may be capable of automatically adding items to detect and eliminate to the object library 408. For example, the object removal user interface system 400 may realize that a user selected, i.e. for the first time, an object to be eliminated. As a result, the object removal user interface system 400 adds the item to the object library 408. Hence, the item will be automatically eliminated in the future. The user may be capable of selecting which items the object removal user interface system 400 stores in the object library 408 for future detection and elimination.

The user interface 402 may ask the user to decide if an identified item should be eliminated. The elimination may include eliminating broadcast or advertising in corner of a screen, pop advertising, nudity, and/or any unwanted item. The elimination may take place by unfocusing, blurring, replacing with another object and/or the like. After determining the object that needs to be eliminated and the way of elimination, the applied analytics 410 performs the object elimination and produces the altered frames 412. Accordingly, utilizing the object removal user interface system 400 allows the user to eliminate objects from a frame without the need for removing original frames, removing the entire frame or removing items prior to broadcasting the frame.

Figure 5:
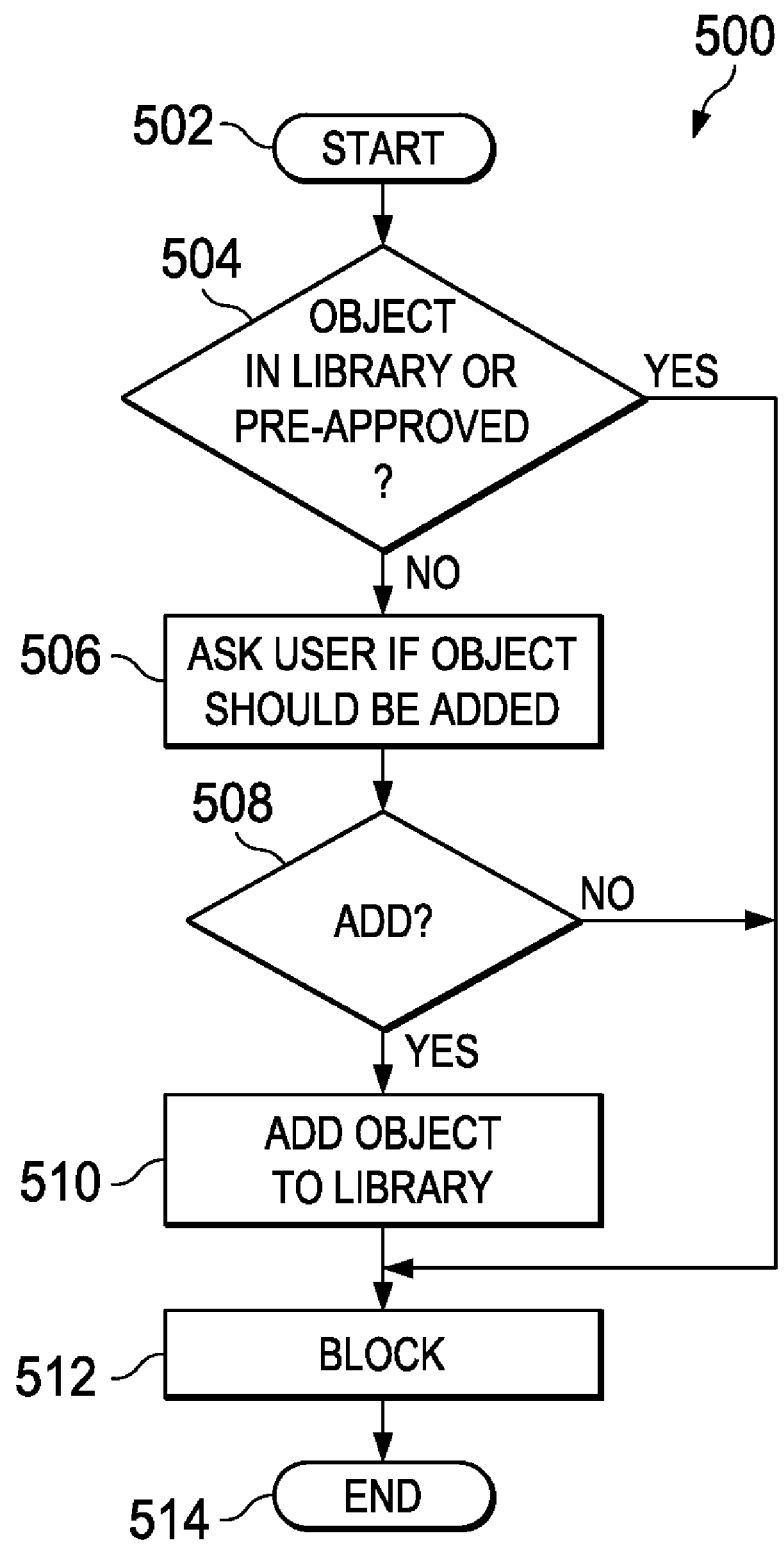
FIG. 5 is a flow diagram depicting an embodiment of a method for blocking objects utilizing a library.

FIG. 5 is a flow diagram depicting an embodiment of a method 500 for blocking objects utilizing a library. The method 500 may be utilized in method 200 of FIG. 2. The method 500 starts at step 502 and proceeds to step 504. At step 504, the method 500 determines if the item to block is in the library or preapproved for elimination. If the item is not in the library, the method 500 proceeds to step 506, wherein the user is asked if the object should be added. From step 506, the method 500 proceeds to step 508. At step 508, the method 500 determines if the object should be added. If the object should be added, the method 500 proceeds to step 510, wherein the method is added. From step 510, the method 500 proceeds to step 512. If the object is not in the library or if the use decides not to add the object to the library, the method 500 proceeds from steps 504 and 508 to step 512. At step 512, the method 500 blocks the object. The method 500 ends at step 514.

While the foregoing is directed to embodiments of the present invention, other and further embodiments of the invention may be devised without departing from the basic scope thereof, and the scope thereof is determined by the claims that follow.

What is claimed is:

1. A method for eliminating unwanted objects in a streaming image, the method comprising:
   recognizing unwanted objects in a streaming image;
   eliminating the recognized unwanted objects from the streaming image, wherein the objects have been added to the image after the creation of the image; and
   wherein eliminating the recognized unwanted object further comprises at least one of determining if elimination mode is at least one of enabled or turned on, determining if an objected is pre-approved for elimination, prior to the streaming of the image; and asking a viewer if an object is to be eliminated.

2. The method of claim 1, wherein the elimination is done by at least one of removing, blacking out, unfocusing, blurring, or replacing the unwanted object.

3. The method of claim 2, wherein replacing the unwanted object further comprising predicting a replacement for the unwanted object.

4. The apparatus of claim 1, wherein the elimination is done by at least one of removing, blacking out, unfocusing, blurring, or replacing the unwanted object.

5. The apparatus of claim 4, wherein replacing the unwanted object further comprising predicting a replacement for the unwanted object.

6. An apparatus for eliminating unwanted objects in a streaming image, comprising:
  means for recognizing unwanted objects in a streaming image;
  means for eliminating the recognized unwanted objects from the streaming image; and
  wherein the means for eliminating further comprises at least one of means for determining if elimination mode is at least one of enabled or turned on, means for determining if an objected is pre-approved for elimination, prior to the streaming of the image; and means for asking a viewer if an object is to be eliminated.

7. A non-transitory computer readable medium comprising software that, when executed by a processor, causes the processor to perform a method for eliminating unwanted objects in a streaming image, the method comprising:
  recognizing unwanted objects in a streaming image; and
  eliminating the recognized unwanted objects from the streaming image, wherein the objects have been added to the image after the creation of the image, wherein eliminating the recognized unwanted object further comprises at least one of determining if elimination mode is at least one of enabled or turned on, determining if an objected is pre-approved for elimination, prior to the streaming of the image; and asking a viewer if an object is to be eliminated.

8. The computer readable medium of claim 7, wherein the elimination is done by at least one of removing, blacking out, unfocusing, blurring, or replacing the unwanted object.

9. The method of claim 8, wherein replacing the unwanted object further comprising predicting a replacement for the unwanted object.

* * * * *